United States Patent [19]
Reinhardt
[11] Patent Number: 4,949,066
[45] Date of Patent: Aug. 14, 1990

[54] CIRCUIT ARRANGEMENT FOR TRANSMITTING A SUPPLY VOLTAGE AND A CONTROL SIGNAL

[75] Inventor: Peter Reinhardt, Lohr, Fed. Rep. of Germany
[73] Assignee: Mannesmann Rexroth GmbH, Lahr Postfach, Fed. Rep. of Germany

[21] Appl. No.: 191,383
[22] Filed: May 9, 1988
[30] Foreign Application Priority Data
May 22, 1987 [DE] Fed. Rep. of Germany ....... 3717260
[51] Int. Cl.[5] ............ H04M 11/04
[52] U.S. Cl. ............ 340/310 R; 340/310 A
[58] Field of Search ........ 340/310 R, 310 A, 310 CP; 364/492

[56] References Cited

U.S. PATENT DOCUMENTS 3,893,535 7/1975 Burckhardt et al. ............ 180/82 R
4,293,846 10/1981 Allison ............ 340/310 A
4,399,886 8/1983 Pollman ............ 180/197

FOREIGN PATENT DOCUMENTS 0226844 11/1986 European Pat. Off. .
2260916 6/1974 Fed. Rep. of Germany .
2848595A1 5/1980 Fed. Rep. of Germany .
2949237A1 6/1980 Fed. Rep. of Germany .
3543073A1 6/1987 Fed. Rep. of Germany .

*Primary Examiner*—Joseph A. Orsino
*Assistant Examiner*—Jeffery A. Hofsass
*Attorney, Agent, or Firm*—Harness, Dickey & Pierce

[57] ABSTRACT

With the invention a supply voltage and a control signal are to be supplied via a two-conductor cable to the power stage of a solenoid valve. For this purpose pulse-width modulation is employed, i.e. in a microcomputer the adjusting signal is converted directly as pulse-width-modulated signal via a power stage to an AC voltage. The control signal is obtained from the pulse width in the power stage.

3 Claims, 1 Drawing Sheet

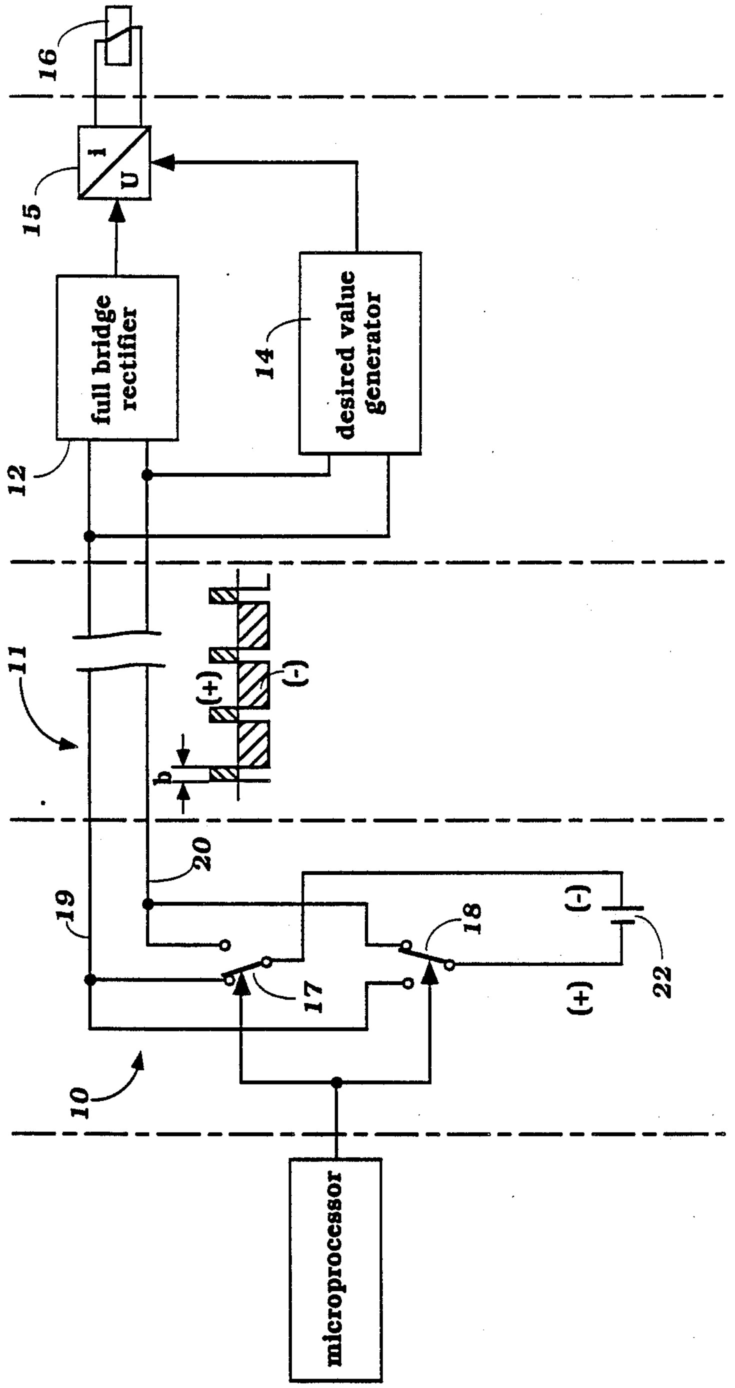
16
15
I
U
full bridge rectifier
desired value generator
14
12
11
b
(+)
(-)
20
19
18
17
(-)
(+)
22
10
microprocessor

CIRCUIT ARRANGEMENT FOR TRANSMITTING A SUPPLY VOLTAGE AND A CONTROL SIGNAL

The invention relates to a circuit arrangement for transmitting a supply voltage and a control signal according to the preamble of claim 1.

Solenoid valves, in particular proportional valves, are driven via an electric amplifier as power stage to which a desired value control signal is supplied which is calculated remote from the power stage in a microprocessor control and is first in the form of a digital signal, being converted with the aid of a digital-analog converter to an analog signal which is conducted as control signal via a cable to the power stage in which from the analog signal a digital signal is again derived for driving the magnet of the valve. The desired value control signal transmitted via the cable usually has an amplitude of ±10 volts.

In addition, via a cable a supply DC voltage, as a rule of 12 volts or 24 volts, must be supplied to the power stage. Thus, hitherto two separate cables each having two conductors were necessary, and the cable for the control signal had to be made shielded to avoid leakage. Also, a digital-analog converter is a relatively expensive component.

The invention is based on the problem of simplifying the signal and supply voltage transmission.

The problem is solved according to the invention by the features in the characterizing clause of claim 1.

The supply voltage is thus transmitted in the form of a pulse-width-modulated signal. The full supply voltage is obtained again by the rectification in the power stage. On the other hand, the pulse width is a measure of the desired value control signal. Thus, it is possible with the invention to transmit the supply voltage and the desired value control signal via a two-conductor cable. In addition, the conversion of the digital output signal of the microprocessor to the analog value to be transmitted is eliminated.

Advantageous further developments of the invention are characterized in the subsidiary claims.

An example of embodiment of the invention will be explained in detail hereinafter with the aid of the single Figure of the drawings in which a circuit diagram of the circuit arrangement is shown.

The circuit arrangement consists of a changeover or two-way contact 10, a two-conductor cable 11 and a power stage which consists of a full-bridge rectifier 12, a desired value generator 14 and an end stage 15, by which the proportional magnet of a valve, not illustrated, is shown. The two-way contact 10 is indicated in the drawing only schematically and consists of two changeover switches 17 and 18 which are actuated by a digital control signal which is furnished by a microprocessor, as shown, and which represents the desired value of the current for the proportional magnet. Circuit details of the changeover contact means 10 are not shown. The changeover switches 17 and 18 are switched so that they alternately connect one conductor 19 or the other conductor 20 of the cable 11 to the positive pole or to the negative pole of a voltage source 22 which furnishes the supply voltage.

Thus, the supply voltage is modulated by the changeover switches 17 and 18 in dependence upon the digital value of the control signal. This gives a pulse-width-modulated circuit in which for example the width b of the positive pulse portion is proportional to the magnitude of the control signal. During the intervals between two positive pulse portions the polarity of the conductors 19 and 20 is interchanged and the negative portion of the supply voltage thus transmitted.

In the full-bridge rectifier 12 at the receiving location, i.e. at the end of the cable, the supply voltage is reestablished in that the negative and positive portions are again combined to give a DC voltage which is supplied to the end stage 15.

In addition, the voltage is tapped off in front of the rectifier 12 and supplied to the desired value generator 14 in which the control signal is again formed which is likewise supplied to the end stage 15.

With the aid of a low-pass filter 14, not shown, the desired value can be converted to a DC voltage having an amplitude which is again proportional to the pulse width b. The low-pass filter necessarily results in a phase displacement and a residual ripple of the control signal.

If this is to be avoided another possibility is to measure the pulse widths in the desired value generator 14 and to generate the desired value quantity in dependence upon the duration of the pulses. This has the advantage that on every sampling of a pulse the actual value is determined. In addition, by measuring the interval time the measurement of the pulse times can be checked.

In the prior art numerous circuits are known for changeover or two-way contacts driven by a digital signal and circuits generating from a pulse width of a digital signal an analog amplitude value.

In the end stage 15 in known manner a current stabilization is carried out irrespective of the resistance change of the magnet.

I claim:

1. Circuit arrangement for transmitting a supply voltage and a control signal via a cable to a power stage for driving a solenoid valve, characterized by a changeover contact in said circuit for switching the polarity of the DC supply voltage alternately between two conductors of said cable to create pulses, the duration of said pulses being modulated in dependence upon the adjusting value of said control signal, and said power stage including a full-bridge rectifier for reestablishing the DC supply voltage from said pulses and a desired value generator for reestablishing the control signal in response to the duration of said pulses.

2. Circuit arrangement according to claim 1, characterized in that the desired value generator consists of a low-pass filter.

3. Circuit arrangement according to claim 1, characterized in that the desired value generator consists of a timing member measuring the pulse duration.

* * * * *